(12) United States Patent
Noh

(10) Patent No.: US 7,558,888 B2
(45) Date of Patent: Jul. 7, 2009

(54) ENHANCED ACCESS TO HIDDEN DATA STORAGE

(75) Inventor: Kyoung Hoon Noh, Yongin (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 11/621,311

(22) Filed: Jan. 9, 2007

(65) Prior Publication Data

US 2007/0174498 A1 Jul. 26, 2007

(30) Foreign Application Priority Data

Jan. 11, 2006 (KR) .................... 10-2006-0003205

(51) Int. Cl.
*G06F 3/00* (2006.01)
*G06F 13/36* (2006.01)
(52) U.S. Cl. .................. 710/50; 710/314; 710/315
(58) Field of Classification Search .............. 710/50, 710/314, 315
See application file for complete search history.

(56) References Cited

U.S. PATENT DOCUMENTS

2005/0240713 A1* 10/2005 Wu et al. ................. 710/314
2006/0285559 A1* 12/2006 Cheng ...................... 370/522
2007/0038835 A1* 2/2007 Tan et al. .................. 711/170

* cited by examiner

*Primary Examiner*—Henry W. H. Tsai
*Assistant Examiner*—Hyun Nam
(74) *Attorney, Agent, or Firm*—Fish & Richardson P.C.

(57) ABSTRACT

An apparatus for executing user commands in digital equipment operating in a USB mass storage (UMS) mode is configured in such a manner that a USB connecting unit transmits and receives commands and data to and from a PC serving as a host through a universal serial bus (USB) port. A USB control unit controls the USB connecting unit. A storage unit stores an access command table including access commands allocated respectively to address shift values, by which addresses contained in one or more user commands received from the PC deviate from a valid address range. A microcomputer determines whether the command received through the USB connecting unit is a user command. If it is determined that the received command is a user command, the microcomputer controls executing the access commands allocated respectively to the address shift values based on the access command table.

21 Claims, 3 Drawing Sheets

FIG. 3

| ex) user command | | access command table | |
|---|---|---|---|
| | | address shift values | access command |
| write block1 (b1+1) data1 | --> | 1 | Write data1 in address0 of hidden area |
| read block1 (b1+2) | --> | 2 | Read relevant data from address0 of hidden area |
| write block1 (b1+3) | --> | 3 | Increase size of hidden area by 1MB |
| read block1 (b1+4) | --> | 4 | Decrease size of hidden area by 1MB |
| ⋮ | | ⋮ | ⋮ |

ENHANCED ACCESS TO HIDDEN DATA STORAGE

BACKGROUND

1. Technical Field

The present invention relates to an apparatus and method for executing user commands in a digital equipment operating in a USB mass storage (UMS) mode. More particularly, the present invention relates to an apparatus and method for executing user commands without any additional drivers in a digital equipment operating in a UMS mode.

2. Description of the Related Art

In general, a high capacity NAND flash memory instead of a hard disk is widely used in a multimedia terminal. For example, a NAND flash memory with a block structure has been currently used in an MP3 player.

An MP3 player using a NAND flash memory mostly operates in a mode in which audio files stored therein are played back, but it may also operate in a USB mass storage (UMS) mode.

In the UMS mode, an MP3 player is connected to a host such as a personal computer (PC) through a universal serial bus (USB) port such that it can be used as an additional hard disk of the host.

However, if the MP3 player operates in a UMS mode, the MP3 player can be set to receive and transmit only the commands according to the UMS standard protocol from and to the host. In order to execute user commands, including a command to access a hidden storage area in a storage area of the MP3 player, which is not supported by the UMS standard protocol, an additional filter driver should be installed in the host.

SUMMARY

In one general aspect, an apparatus and method for executing user commands in a digital equipment (particularly, an MP3 player) operating in a UMS mode without an additional filter drivers installed in a host are provided.

The apparatus for executing user commands in a digital equipment operating in a UMS mode includes a storage means for storing an access command table including access commands allocated respectively to one or more user commands, a connecting means connected to receive a command from a host, a determining means for determining whether the command received from the host through the connecting means is a user command, and a control means for controlling executing a relevant access command, based on the stored access command table, if it is determined that the received command is a user command.

The determining means may determine that the received command is a user command when an address contained in the received command is not within a valid address range of a storage area.

The access command table may include the access commands allocated respectively to the user commands in accordance with address shift values by which addresses contained in the user commands deviate from the valid address range.

The host may include a personal computer (PC). The connecting means may include a universal serial bus (USB) port. Also, the access command may be a command to access a hidden area in the storage area.

The method for executing user commands in a digital equipment with a storage unit, which operates in a UMS mode, includes a first step of receiving a command from a host, a second step of determining whether the received command is a user command defining an operation which is not part of a UMS standard protocol, and a third step of executing a relevant access command, based on a stored access command table, if it is determined that the received command is a user command.

In the second step, it may be determined that the received command is a user command when an address specified by the received command is not consistent with an address structure of the storage unit. For example, the address specified by the received user command may be outside an address range specified by the received user command.

The access command table may include the access commands allocated respectively to the user commands in accordance with address shift values by which addresses contained in the user commands deviate from the valid address range.

The host may include a personal computer (PC). The command may be received from the host through a USB port. The access command may be a command to access a hidden area in the storage area.

In another general aspect, a data storage apparatus is provided. The data storage apparatus includes a connecting unit configured to communicate with a host, a storage unit configured to store data communicated with the host through the connecting unit, and a processing unit configured to execute commands received from the host through the connecting unit, wherein the processing unit is configured to execute the commands from the host in two different modes.

The processing unit may be configured to execute a command according to a UMS standard protocol in a first mode, and to execute a user command defining an operation which is not part of the UMS standard protocol in a second mode.

The user command may include an address which is not consistent with an address structure of the storage unit. For example, the user command specifies a block of the storage unit and an address which is outside an address range of the block. An address shift value may be defined by a difference between the address specified by the user command and the address range of the block specified by the user command. Then, the processing unit may execute the user command based on the address shift value of the user command.

For example, the storage unit may store an access command table which includes a plurality of address shift values and corresponding access commands, and the processing unit may execute one of the access commands which corresponds to the address shift value of the user command.

According to the aforementioned configuration and operating process, user commands can be executed in a digital equipment operating in a UMS mode without any additional drivers installed in a host.

BRIEF DESCRIPTION OF THE DRAWINGS

The above and other features and advantages will become apparent from the following description given in conjunction with the accompanying drawings, in which:

FIG. 3 is an example of an access command table; and

DETAILED DESCRIPTION

The described techniques can be applied to various apparatus, including an MP3 player, a portable multimedia player (PMP), a portable mobile communication terminal, a personal digital assistant (PDA), and the like. An implementation of an MP3 player is described herein by way of example.

Figure 1:
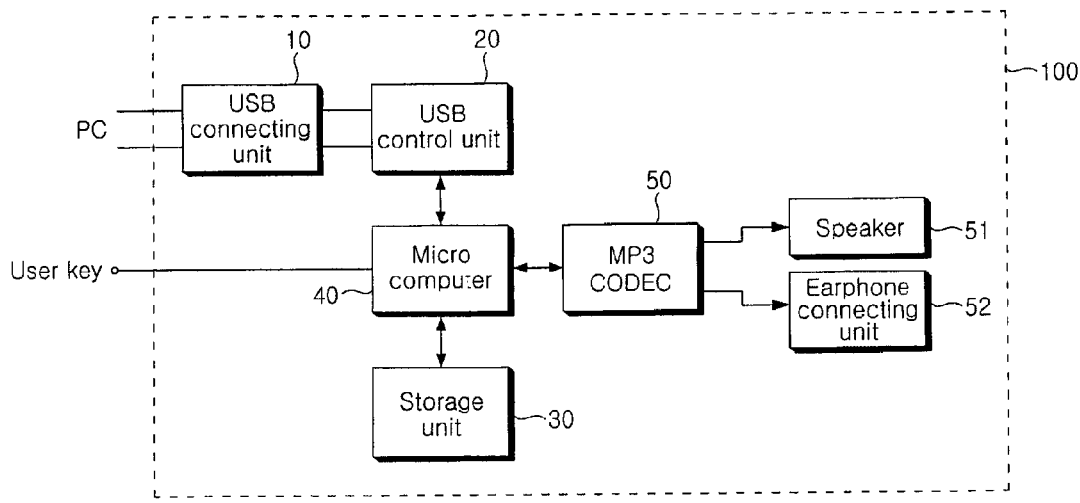
FIG. 1 is a block diagram of an example MP3 player.
Figure 2:
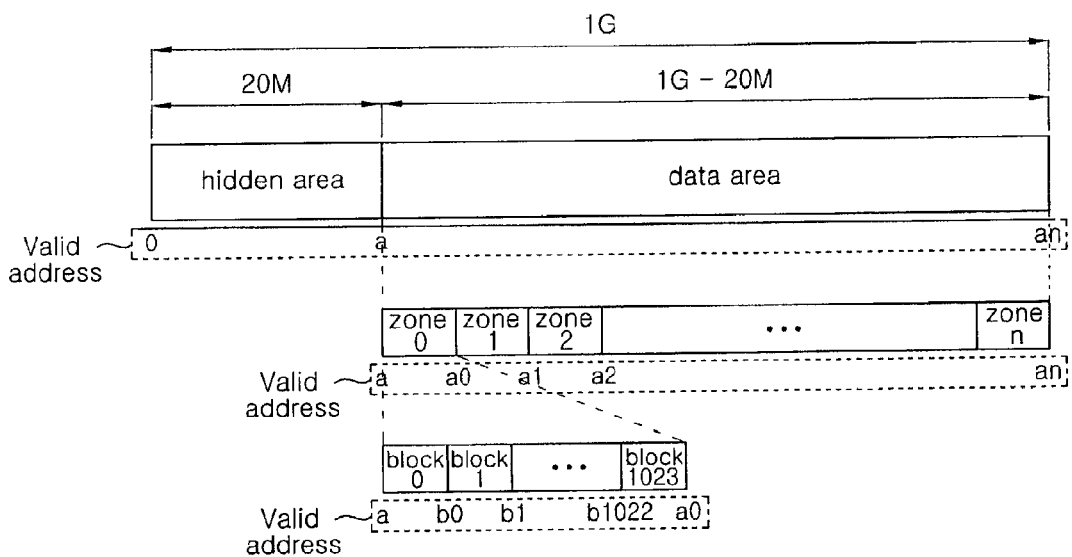
FIG. 2 is a view illustrating an example of a storage area of the MP3 player.

FIG. 1 is a block diagram of an MP3 player. FIGS. 2 and 3 show a storage area and an access command table of the MP3 player, respectively.

The MP3 player may operate in a UMS mode in which the MP3 player is used as a hard disk of a personal computer (PC) serving as a host.

A USB connecting unit 10 transmits and receives commands and data to and from a PC serving as a host through a universal serial bus (USB) port. A USB control unit 20 controls the operation of transmitting and receiving commands and data in the USB connecting unit 10.

A storage unit 30 may store an access command table in addition to a variety of audio files. The access command table may include access commands allocated respectively to user commands in accordance with address shift values by which addresses contained in one or more user commands received from the PC deviate from valid address ranges.

A processing unit, such as a microprocessor 40, is configured to execute commands received from the PC through the connecting unit in two different modes. In a normal mode, or in a first mode, the received command executed by the micro processor 40 is defined by the UMS standard protocol. In a second mode, the received command is a user command which defines an operation which is not part of the UMS standard protocol.

The microcomputer 40 determines whether the command received through the USB connecting unit 10 is a user command.

For example, the user command can be defined as a command received from the PC which includes an address which is not consistent with the address structure of the storage unit. Specifically, the address in the user command may not belong to the valid address range as specified by the user command. As shown in FIG. 2, the 1 GB storage area of the MP3 player using a NAND flash memory with a block structure can be divided into a 20 MB hidden area and a 0.98 GB data area. In this case, the valid address range of 'block0' corresponds to a~b0 and the valid address range of 'block1' corresponds to b0~b1. If the command received from the PC is 'write block1 (b1+1) data1' to request that data1 be written at a position of the address (b1+1) of block1, it can be determined that the received command is a user command since the address (b1+1) is not within the valid address range of block1.

As explained above, a received command may be determined to be a user command if the address specified by the command is outside the address range of a block specified by the command. Then, an address shift value may be calculated. For example, the address shift value may be defined as a difference between the address specified by the user command and the address range of the block specified by the user command. In the above example, the address shift value of the command 'write block1 (b1+1) data1' is 1, because the difference between the address b1+1 and the address b1 (the upper limit of the address range of block 1) is 1. With the address shift value, the micro processor 40 may execute an access command which corresponds to the address shift value in an access command table, for example, as illustrated in FIG. 3.

Referring back to the above example of command 'write block1 (b1+1) data1,' if it is determined that the command 'write block1 (b1+1) data1' received through the USB connection unit 10 is a user command, the microcomputer 40 controls executing the access command 'write hidden area address0 data1' allocated to the address shift value of '1' by which the address contained in the user command deviates from the valid address range, based on the access command table (shown in FIG. 3).

Accordingly, the operation of accessing the hidden area may be executed, which is not part of the UMS protocol, using a command format supported by the existing UMS protocol. Therefore, it is not necessary to install an additional filter driver.

Meanwhile, an MP3 CODEC (MP3 Coder-Decoder) 50 decodes audio files read out from the storage unit 30 by the microcomputer 40 and restores the decoded files into digital audio signals. The digital audio signals restored by the MP3 CODEC 50 are outputted through a speaker 51 or an earphone connecting unit 52.

Figure 4:
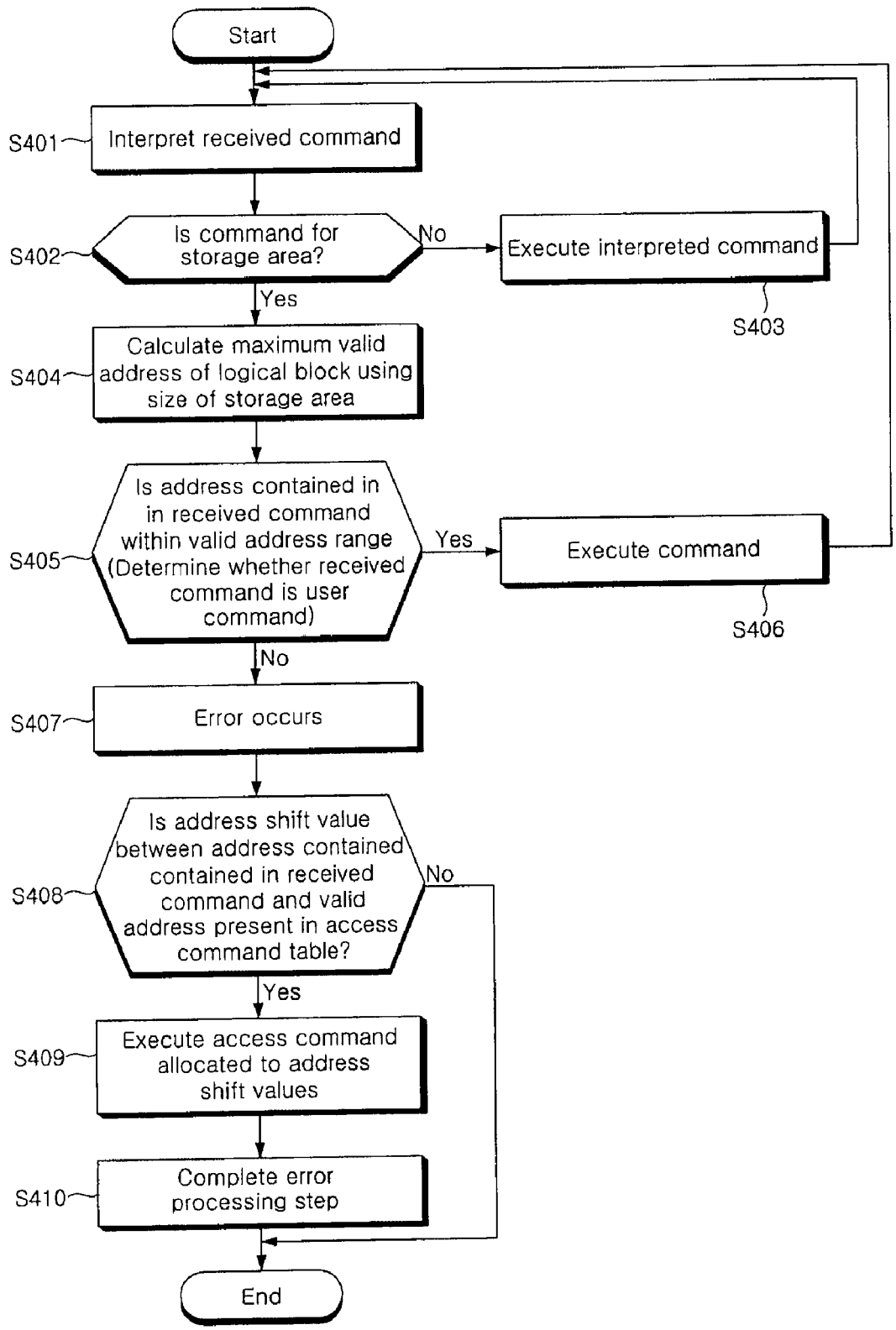
FIG. 4 is a flowchart of a method of executing user commands in the MP3 player operating in a UMS mode.

FIG. 4 is a flowchart illustrating a method of executing user commands of the MP3 player as shown in FIG. 1, which operates in a UMS mode.

If a command is received from the PC serving as the host through the USB connecting unit 10, the microcomputer 40 interprets the received command (S401). Before sending the command, the host may convert a command in accordance with the access command table. That is, if a desired user command is inputted at the host, the host converts the user command in accordance with the predetermined access table and then transmits the converted user command to the MP3 player.

If it is interpreted by the microcomputer 40 that the received command is not for the storage area ('No' in S402), the microcomputer 40 executes the interpreted command (S403) and then causes the process to be returned to step S401 in which the next received command is interpreted.

On the other hand, if it is interpreted in step S401 by the microcomputer 40 that the received command is for the storage area ('Yes' in S402), the microcomputer 40 calculates address ranges of logical blocks of the storage area (S404).

Explaining in more detail, the size of the storage area is a size of the storage area of the MP3 player. As shown in FIGS. 2 and 3, if it is assumed that the size of the storage area is 1 GB, the storage area is divided into n zones, and each zone is composed of block 0 to block 1,023, i.e. 1,024 blocks, the size of the data area is 0.98 GB which is calculated by subtracting 20 MB, which is the size of the hidden area, from 1 GB.

Further, based on the size of each zone calculated by dividing the 0.98 GB data area by n, which is the number of the zones, and a start address of the data area, which is a in FIG. 2, the start and end addresses of each zone can be calculated.

In a similar manner, by calculating the size of each block by dividing each zone by 1,024 and by considering the calculated size of each block from the start address of each zone, the start and end addresses of each block can be calculated.

The address so calculated is referred to as a valid address. For convenience of explanation, it is assumed that the start and end valid addresses of zone0 are a and a0, respectively, the start and end valid addresses of zone1 are a0 and a1, respectively, and the start and end valid addresses of block1023 in zone0 are b1022 and a0, respectively.

If the valid addresses of each block have been calculated, the microcomputer 40 determines whether the addresses contained in the received command are within the valid address range (S405).

If it is determined that the addresses are within the valid address range ('Yes' in S405), the microcomputer 40 executes the command (S406), and then causes the process to be returned to S401 in which the next received command is interpreted.

As described in the above example, if the command received from the PC is 'write block1 (b1+1) data1' to request that data1 be written in a position of address (b1+1) of block1, the address (b1+1) is not within the valid address range of block1 ('No' in S405). Therefore, the microcomputer 40 determines the received command as a user command and generates an error signal (S407).

Then, by using the valid address range calculated in S404, the microcomputer 40 calculates an address shift value by which the address contained in the received command deviates from the valid address range and determines whether the calculated address shift value is within the access command table (S408).

If it is determined that the calculated address shift value is within the access command table ('Yes' in S408), the microcomputer 40 controls executing the access command 'write hidden area address0 data1' allocated to the address shift value '1' (S409) and thus completes an error processing step (S410).

If it is determined that the calculated address shift value is not within the access command table ('No' in S408), the microcomputer 40 immediately completes an error processing step (S410).

Therefore, although it appears that an error occurs (according to the UMS standard protocol) and is thus processed, the access command (that is, the user command accessing the hidden area) set based on the difference between the address contained in the command received from the PC and the valid address of the MP3 player is actually executed.

According to the apparatus and method for executing user commands in a digital equipment operating in a UMS mode, the user commands can be executed without an additional filter driver installed in a host.

Other implementations are within the scope of the following claims.

What is claimed is:

1. A computer-implemented method for executing a user command in a digital equipment with a storage unit, the method comprising:
   receiving a command from a host, the received command requesting access to an address of the storage unit, the storage unit comprising primary and hidden data storage regions, and the received command being received using a protocol which does not allow commands to request direct access to the hidden data storage region;
   determining, when the address is not within a valid address range associated with the primary data storage region, that the received command is a user command defining an operation which is not part of the protocol;
   calculating a deviation value by which the address deviates from the valid address range; and
   executing a relevant access command for accessing the hidden storage region, based on applying the deviation value to a stored access command table, when determining that the received command is the user command defining the operation which is not part of the protocol.

2. The method of claim 1, wherein the protocol comprises a Universal Serial Bus (USB) Mass Storage (UMS) protocol as specified by the USB Device Class Definition for Mass Storage Devices, Revision 1.2, dated Jun. 23, 2003.

3. The method of claim 1, wherein executing the relevant access command further comprises accessing the stored access command table, the stored access command table including a plurality of alternate commands corresponding to a plurality of deviation values.

4. The method of claim 1, further comprising executing the received command when determining that the address is within the valid address range associated with the primary data storage region.

5. The method of claim 1, further comprising determining whether the address is within a valid address range of a block of the primary data storage region identified by the received command.

6. The method of claim 1, wherein:
   the received command requests write access to an address outside of the valid address range associated with the primary data storage regions, and
   executing the relevant access command further comprises performing the write access on the hidden data storage region.

7. The method of claim 1, wherein:
   the received command requests write access to an address outside of the valid address range associated with the primary data storage regions, and
   executing the relevant access command further comprises increasing a size of the hidden data storage region.

8. The method of claim 1, wherein:
   the received command requests read access to an address outside of the valid address range associated with the primary data storage regions, and
   executing the relevant access command further comprises performing the read access on the hidden data storage region.

9. The method of claim 1, wherein:
   the received command requests write access to an address outside of the valid address range associated with the primary data storage regions, and
   executing the relevant access command further comprises decreasing a size of the hidden data storage region.

10. The method of claim 1, further comprising generating an error signal when determining that the address is not within the valid address range associated with the primary data storage region.

11. A device comprising:
   a connecting unit configured to receiving a command from a host, the received command requesting access to an address of the storage unit, the storage unit comprising primary and hidden data storage regions, and the received command being received using a protocol which does not allow commands to request direct access to the hidden data storage region; and
   a processor configured to:
      determine, when the address is not within a valid address range associated with the primary data storage region, that the received command is a user command defining an operation which is not part of the protocol,
      calculate a deviation value by which the address deviates from the valid address range, and
      execute a relevant access command for accessing the hidden storage region, based on applying the deviation value to a stored access command table, when determining that the received command is the user command defining the operation which is not part of the protocol.

12. The device of claim 11, wherein the connecting unit and the processor are housed within a portable music player.

13. The device of claim 11, wherein the protocol comprises a Universal Serial Bus (USB) Mass Storage (UMS) protocol as specified by the USB Device Class Definition for Mass Storage Devices, Revision 1.2, dated Jun. 23, 2003.

14. The device of claim 11, wherein executing the relevant access command further comprises accessing the stored access command table, the stored access command table including a plurality of alternate commands corresponding to a plurality of deviation values.

15. The device of claim 11, wherein the processor is further configured to execute the received command when determining that the address is within the valid address range associated with the primary data storage region.

16. The device of claim 11, wherein the processor is further configured to determine whether the address is within a valid address range of a block of the primary data storage region identified by the received command.

17. The device of claim 11, wherein:
the received command requests write access to an address outside of the valid address range associated with the primary data storage regions, and
executing the relevant access command further comprises performing the write access on the hidden data storage region.

18. The device of claim 11, wherein:
the received command requests write access to an address outside of the valid address range associated with the primary data storage regions, and
executing the relevant access command further comprises increasing a size of the hidden data storage region.

19. The device of claim 11, wherein:
the received command requests read access to an address outside of the valid address range associated with the primary data storage regions, and
executing the relevant access command further comprises performing the read access on the hidden data storage region.

20. The device of claim 11, wherein:
the received command requests write access to an address outside of the valid address range associated with the primary data storage regions, and
executing the relevant access command further comprises decreasing a size of the hidden data storage region.

21. A computer readable medium encoded with a computer program comprising instructions that, when executed, operate to cause a microcomputer to perform operations comprising:
receiving a command from a host, the received command requesting access to an address of the storage unit, the storage unit comprising primary and hidden data storage regions, and the received command being received using a protocol which does not allow commands to request direct access to the hidden data storage region;
determining, when the address is not within a valid address range associated with the primary data storage region, that the received command is a user command defining an operation which is not part of the protocol;
calculating a deviation value by which the address deviates from the valid address range; and
executing a relevant access command for accessing the hidden storage region, based on applying the deviation value to a stored access command table, when determining that the received command is the user command defining the operation which is not part of the protocol.

* * * * *